J. M. CAGE.
INTERNAL COMBUSTION ENGINE AND METHOD OF OPERATING THE SAME.
APPLICATION FILED MAR. 15, 1916.
1,301,036.
Patented Apr. 15, 1919.
2 SHEETS—SHEET 1.
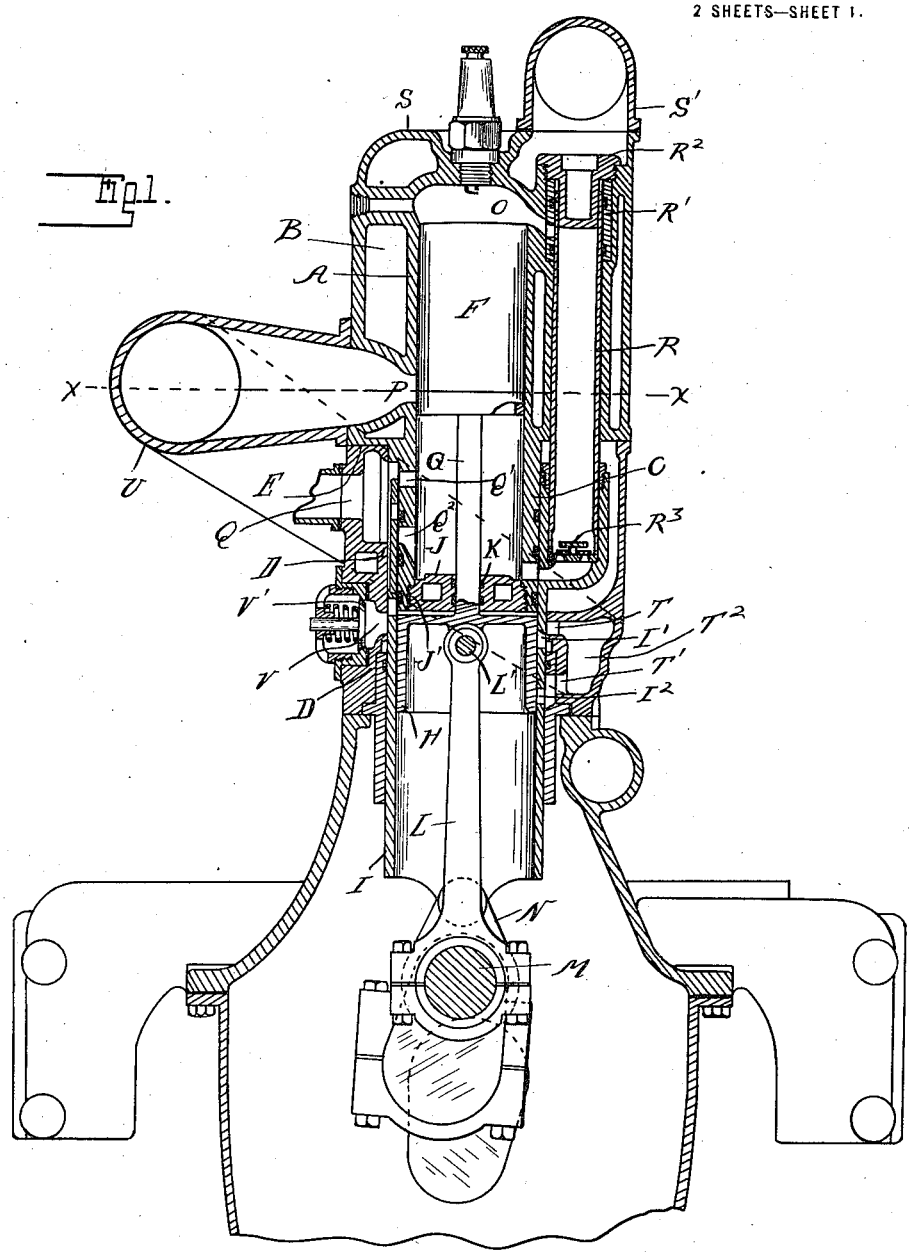
Inventor
John M. Cage
Attorneys

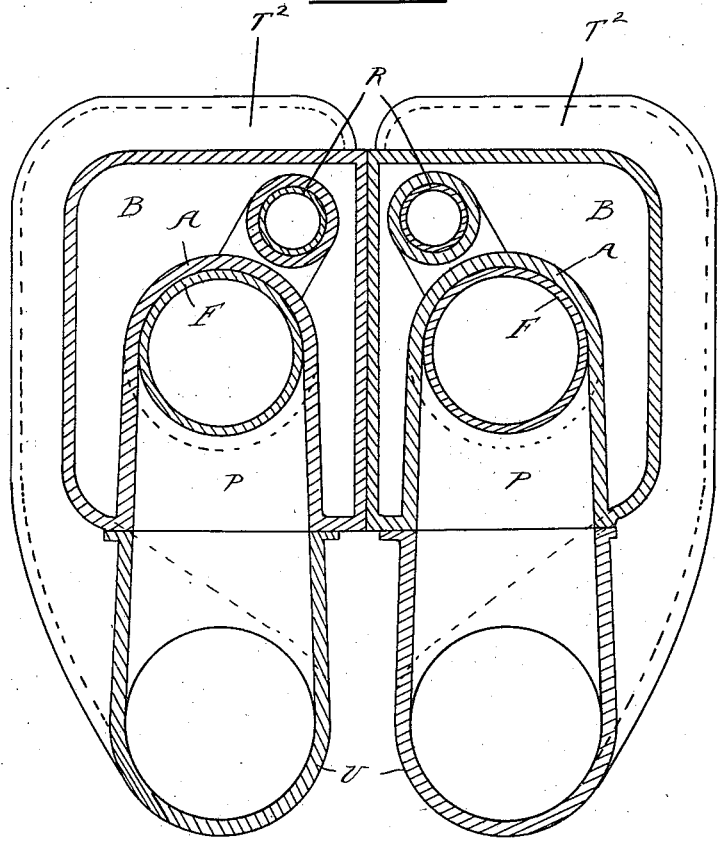

UNITED STATES PATENT OFFICE.

JOHN M. CAGE, OF DETROIT, MICHIGAN.

INTERNAL-COMBUSTION ENGINE AND METHOD OF OPERATING THE SAME.

1,301,036. Specification of Letters Patent. Patented Apr. 15, 1919.

Application filed March 15, 1916. Serial No. 84,420.

*To all whom it may concern:*

Be it known that I, JOHN M. CAGE, a citizen of the United States of America, residing at Detroit, in the county of Wayne and State of Michigan, have invented certain new and useful Improvements in Internal-Combustion Engines and Methods of Operating the Same, of which the following is a specification, reference being had therein to the accompanying drawings.

The invention relates to internal combustion engines and comprises a novel method of operation and also a novel construction. In particular the invention has reference to the means and the method of evacuating the cylinder of the products of combustion, and further in the means for introducing the explosive charge.

In the present state of the art the greatest power and efficiency in the operation of an internal combustion engine is generally obtained by an unrestricted exhaust into the external atmosphere. For many uses, however, it is desirable to avoid the noise of the exhaust, and to this end a muffler is employed, with a sacrifice in power and efficiency of the engine. It is the object of my invention to increase both the power and efficiency of the engine, and also to completely eliminate noise of exhaust, which is accomplished, first, by the elimination of atmospheric back-pressure and the discharge of the exhaust gases into a partial vacuum; second, by utilizing the inertia of the outgoing exhaust wave for opposing a counter-wave of back-pressure; third, by cooling the exhaust while confined so that when eventually ejected it is of minimum volume and less than that of the explosive charge introduced.

The nature of my invention will be best understood by considering the following principles involved: When the products of explosion are exhausted directly into the atmosphere there is produced a baffling effect, resulting in a recoil or counter-wave which greatly interferes with the freedom of exhaust. If, on the other hand, the gases were exhausted into a vacuum this counter-wave would be entirely absent and all back pressure would therefore be eliminated. Again, if the gases were exhausted into a closed vacuum chamber of limited capacity, the counter-wave of back pressure would be delayed for a short interval, varying with the distance of the confining wall from the exhaust port. This will be true even where the capacity of the exhaust chamber is so limited as to eventually build up a considerable pressure,—for the inertia of the outgoing wave would delay the counter-wave and by closing the port before the return wave the cylinder would be completely evacuated.

During the explosion of a combustible gaseous charge the pressure developed is sufficient to expand or dilate the gaseous products of combustion to several times their original volume when at atmospheric pressure. If, however, these products of combustion are cooled to the same temperature as that of the original charge their volume at the same pressure is less. As a consequence, the displacement of the piston impelled by the explosion is more than sufficient to eject the cooled products of combustion from a confined chamber.

Based upon the principles as above stated, I have devised a method of evacuating the cylinder of exhaust gases by the production of a temporary vacuum external to the exhaust port, sufficient to delay back pressure until the inertia of the outgoing wave will counteract the same. I have further devised a method of producing and maintaining the vacuum by retaining the exhaust gases in confinement until sufficiently lowered in temperature to be substantially equal to or less than the original volume. Thus a pump substantially equal in displacement to the power piston will be sufficient to eject the cooled gases and maintain the vacuum.

I have further devised a novel construction of apparatus in which there occurs simultaneously the explosion of one charge, the compression of another charge and the suction of exhaust gases during the movement of each piston in one direction, and the suction of a new charge, compression of the transferred charge and ejection of a burnt charge during each return stroke of the piston. Thus in a multi-cylinder engine of this construction there will be an explosion for each piston in each revolution of the crank shaft.

My invention further comprises various more specific features of construction as hereinafter set forth.

In the drawings:

Figure 1 is a cross section through the engine in the axial plane of one of the cylinders; and Fig. 2 is a horizontal section thereof.

In the specific embodiment of my invention illustrated in Figs. 1 and 2, A is an engine cylinder, the upper portion of which is surrounded by a water jacket B. C is an extension of said cylinder beyond the water-jacketed portion, and D is a cylinder of large diameter surrounding the portion C, leaving an annular space therebetween. The portion D is also preferably water-jacketed, and has a shouldered engagement at E with the cylinder A, for maintaining both cylinders in axial alinement. F is a piston within the cylinder A, which is connected by a rod G with a second piston H within the cylinder D. This piston H slides within an annular valve-sleeve I within the cylinder D and extending upward in the annular space between said cylinder and the cylinder A. J is a head or division wall between the cylinders A and B, which as shown has a threaded engagement with the former at J', and is also provided with packing rings K for forming a gas-tight seal with the rod G. L is a pitman rod connected to the wrist pin L' in the piston H and at its opposite end to the crank M, and N is an eccentric or other operating connection for actuating the sleeve I.

The construction as thus far described is designed to form a tandem arrangement of explosion, compression and exhaust cylinders, which are interconnected with each other and controlled as follows. The space within the cylinder A above the piston F forms the explosion or power cylinder, receiving the explosive charge through a port O near the upper end and exhausting through a port P at its lower end. The space within the cylinder A below the piston F and above the head or partition J forms a suction and compression chamber into which the explosive charge is first drawn and then compressed and ejected to transfer the same to the power cylinder. The gas is introduced into this compression cylinder from an induction conduit Q through ports Q' and Q² controlled by the sleeve-valve I. After compression the gas is ejected into a transfer conduit R, which preferably is a tube mounted upon the sleeve I and extending upwardly external to the cylinder A through the water-jacket B to a cylindrical valve case R'. This valve case is formed in the head S of the cylinder A and has the inlet port O communicating therewith, the arrangement being such that the tube R in connection with the casing R' forms a piston-valve for controlling the opening and closing of the port O. The casing R' is preferably arranged opposite the water inlet conduit S' on the head S, so as to provide convenient access thereto, and a chambered core R² extending into the tube R forms the means of cooling the latter. Thus the charge of gas which is compressed by the downward movement of the piston F will be forced into the tube R and at the proper time in the movement of the valve I said tube R will open the port O, permitting the compressed charge to pass into the power cylinder. A check-valve R³ at the lower end of the tube R is preferably used and will serve to hold the gaseous charge therein upon the return or upward stroke of the piston F.

The space below the head or partition J and above the piston H forms a vacuum pump cylinder for forming a partial vacuum in the exhaust conduit and for finally ejecting the products of combustion. The inlet to this chamber is also controlled by ports in the valve sleeve I, indicated at I' and I², said ports being registrable with ports T and T' in the cylinder D, which communicate with a conduit T² leading to the exhaust manifold U. This exhaust manifold is so located in relation to the cylinder A as to provide a gradually expanding and preferably straightway discharge passage from the exhaust port P of the cylinder, and the length between said port P and the manifold U is sufficient to receive the exhaust wave, as will be hereinafter explained. In general, the arrangement is such that the operation of the piston H in the cylinder D will periodically eject the gases from the manifold U, and will form a partial vacuum therein, which facilitates the rapid exhaust of the gases from the power cylinder. The gas sucked into the cylinder D on the downward stroke of the piston H is ejected either directly into the atmosphere or into a suitable exhaust conduit through a port V controlled by the sleeve-valve I, and a check-valve V' also controlling the port will prevent drawing in of the air when the pressure in the cylinder is less than atmospheric.

In operation when the engine is started, the initial gaseous charge drawn in upon the up-stroke of the piston F and compressed on its down-stroke, is transferred into the tube R where it is retained under comparatively high pressure until the port O is opened. The opening of this port O is preferably timed to occur subsequent to the closing of the exhaust port P by the upward movement of the piston F, but may be somewhat in advance of the closing thereof, so that the expansion of the compressed gas will operate to scavenge any remnant of burnt gases in the cylinder. The gas thus introduced will be compressed upon the upstroke of the piston, so that an explosion occurs upon each down-stroke. Simultaneously a succeeding charge of gas is drawn into the chamber below the piston F and compressed into the transfer tube R, while the lower chamber between the head J and piston H operates as an exhaust pump for removing the gas from the manifold and lowering the pressure therein.

After the engine is in full operation a relatively high vacuum will be maintained in the manifold U, as the heat of explosion is largely dissipated during the movement of the gases through the manifold and conduit T into the pump cylinder. Consequently the volume of the cooled gas at atmospheric pressure would be less than the volume of the gaseous charge introduced when under the same pressure, and as the displacement of the piston H is equal to or in excess of the displacement of the piston F a partial vacuum will be at all times maintained.

What I claim as my invention is:—

1. In an explosion engine, the combination with a cylinder having explosion and gas-compression chambers in the opposite ends thereof, of a piston in said cylinder, a sleeve-valve concentric with said cylinder for controlling ports of one of said chambers, and a tube eccentric to and external of said cylinder carried by said sleeve-valve, forming a transfer conduit and valve controlling the other of said chambers.

2. In an explosion engine, the combination with a cylinder having explosion and gas-compression chambers at opposite ends thereof, of a piston in said cylinder, a sleeve-valve concentric with said cylinder, controlling ports of one of said chambers, a tube eccentric of and external to said cylinder, carried by said sleeve-valve and connected with a chamber controlled thereby in one position of adjustment, and a ported cylindrical case for receiving the opposite end of said tube and coacting therewith to control connection between said tube and the other of said chambers.

3. In an explosion engine, the combination with a cylinder having an explosion chamber at one end thereof and a gas-compression chamber at the opposite end, with an intermediate exhaust port, of a piston in said cylinder controlling said exhaust port, a sleeve-valve concentric with said cylinder at the gas-compression end thereof and controlling ports to said chamber, a tube mounted on said sleeve eccentric of and external to said cylinder, forming a chamber and transfer passage for the gas compressed in said compression chamber, and a ported cylindrical casing coöperating with the opposite end of said tube for controlling the discharge of gas therefrom into said explosion chamber.

4. In an explosion engine, the combination with a cylinder having explosion and gas-compression chambers in the opposite ends thereof, of a piston in said cylinder, a sleeve-valve, concentric with said cylinder for controlling ports of one of said chambers, and a valve external of said cylinder carried by said sleeve-valve for controlling the transfer of compressed gas from the gas compression chamber to the explosion chamber of said cylinder.

5. The herein described method of evacuating an explosion chamber, comprising discharging the exhaust into a chamber of constant capacity, forming a partial vacuum in the chamber in advance of the discharge of exhaust thereinto to accelerate the velocity of the exhaust wave into the chamber, and stopping the exhaust discharge before the return wave of exhaust reaches the point where the exhaust is discharged into the chamber.

6. The herein described method of evacuating an explosion chamber, comprising discharging the exhaust gases into a vacuum chamber of sufficient length and capacity to receive the exhaust wave and to delay the return of the exhaust wave until the exhaust has been completely discharged thereinto, stopping communication of the exhaust with the chamber before the return wave reaches the point of such communication, and ejecting the exhaust gases from said chamber to create therein the partial vacuum.

7. The herein described method of evacuating the explosion chamber in an internal combustion engine, comprising discharging the exhaust gases into a vacuum chamber of constant capacity and of sufficient length and capacity to receive the exhaust wave and to delay the return of the exhaust wave until the exhaust has been completely discharged thereinto, stopping communication of the exhaust with the chamber before the return wave reaches the point of such communication, holding the exhaust gases in said chamber during a stroke of the engine and cooling and thus contracting them during that period, and then ejecting the exhaust gases from said chamber to create therein the partial vacuum preliminary to the next discharge of exhaust thereinto.

8. In an internal combustion engine, the combination of a power cylinder, a piston therein, means to introduce an explosive charge to the cylinder, an exhaust chamber communicating by a port with the cylinder, said port adapted to be opened when the piston reaches the end of its power stroke, said chamber being of a length and capacity to receive the exhaust wave from said cylinder and to retard the return of the wave of exhaust to the exhaust port until after that port is closed; a coöperating exhaust mechanism having a suction stroke and means for communicating the exhaust mechanism with the exhaust chamber during its suction stroke, said suction stroke and said means of communication being timed so that the exhaust gases are held in the chamber during at least one stroke of the mechanisms.

In testimony whereof I affix my signature.

JOHN M. CAGE.